US011102157B2

(12) United States Patent
Gadepalli et al.

(10) Patent No.: US 11,102,157 B2
(45) Date of Patent: Aug. 24, 2021

(54) RECOMMEND VIEWING OF AN OBJECT TO FRIENDS WITHIN A SOCIAL NETWORK

(71) Applicant: INTERNATIONAL BUSINESS MACHINES CORPORATION, Armonk, NY (US)

(72) Inventors: Venkata V. Gadepalli, Apex, NC (US); Trudy L. Hewitt, Cary, NC (US); Ashok K. Iyengar, Encinitas, CA (US); James M. Moreno, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 509 days.

(21) Appl. No.: 15/195,295

(22) Filed: Jun. 28, 2016

(65) Prior Publication Data
US 2017/0374005 A1  Dec. 28, 2017

(51) Int. Cl.
*H04L 12/58* (2006.01)
*H04L 29/08* (2006.01)

(52) U.S. Cl.
CPC .............. *H04L 51/24* (2013.01); *H04L 51/10* (2013.01); *H04L 51/20* (2013.01); *H04L 51/32* (2013.01); *H04L 67/18* (2013.01)

(58) Field of Classification Search
CPC .......... H04L 51/24; H04L 51/20; H04L 67/22
USPC ....................................................... 709/206
See application file for complete search history.

(56) References Cited

U.S. PATENT DOCUMENTS

| 9,014,726 | B1* | 4/2015 | Foster | ..................... | H04W 4/02 |
| | | | | | 455/456.5 |
| 2013/0095855 | A1* | 4/2013 | Bort | ........................ | G06T 17/05 |
| | | | | | 455/456.2 |
| 2014/0002486 | A1 | 1/2014 | Ratcliff et al. | | |
| 2014/0365484 | A1* | 12/2014 | Freeman | .................. | H04W 4/21 |
| | | | | | 707/736 |
| 2015/0172327 | A1* | 6/2015 | Wansley | ................ | G06Q 50/01 |
| | | | | | 715/753 |
| 2015/0347458 | A1* | 12/2015 | Hong | ...................... | G01C 21/32 |
| | | | | | 707/722 |
| 2017/0139657 | A1* | 5/2017 | Shah | ................... | G06F 16/4393 |

(Continued)

OTHER PUBLICATIONS

Brian Voo, "10 Free Astronomy Apps for Stargazing ", Website—http://www.hongkiat.com/blog/stargazing-apps/.

(Continued)

*Primary Examiner* — Kevin T Bates
*Assistant Examiner* — Emad Siddiqi
(74) *Attorney, Agent, or Firm* — Cantor Colburn LLP; Michael O'Keefe (57) ABSTRACT

A computer-implemented method for recommending viewing of an image includes obtaining, using a processor system, a visual image of an object relating to a particular subject matter. The method also includes determining the location of the object. A plurality of friend records is provided wherein the friend records identify interest in respective subject matter and the general location of the friend. A friend interested in the subject matter of the object is identified and their respective location. If the object is potentially viewable to the interested friend, a notification of the object is sent to the individual.

6 Claims, 6 Drawing Sheets

(56) References Cited

U.S. PATENT DOCUMENTS

2017/0300511 A1* 10/2017 Brewington ............ G06F 16/29

OTHER PUBLICATIONS

Cass Everitt, "Space junk pro", Website—https://play.google.com/store/apps/details?id=us.xyzw.star3map&feature=search_result, Aug. 24, 2013.

Vito Technology Inc., "Star walk™—The Astronomy Guide to View Stars, Planets & Night Sky Map Support", Website—https://itunes.apple.com/in/app/star-walk-5-stars-astronomy/id295430577?mt=8, Apr. 20, 2015.

Apple Itunes App Store "SkyView Lite" by Terminal Eleven LLC; retrieved from https://itunes.apple.com/us/app/skyview-free-explore-universe/id413936865?mt=8; dated Oct. 18, 2019; 4 pgs.

Google Play App Store "Sky Map", retrieved from https://play.google.com/store/apps/details?id=com.google.android.stardroid&hl=en; dated Oct. 18, 2019; 3 pgs.

* cited by examiner

RECOMMEND VIEWING OF AN OBJECT TO FRIENDS WITHIN A SOCIAL NETWORK

BACKGROUND

Individuals interested in astronomy and star gazing may observe a particular feature of the sky which they would like to bring to the attention of individuals within their social network at alternative geographic locations. Accordingly, there is a need to inform the respective individuals within the social network of the particular feature and its location with respect to their physical location.

SUMMARY

In accordance with one or more embodiments, a computer-implemented method for recommending viewing of an object is provided. The method includes obtaining, using a processor system, a visual image of an object relating to a particular subject matter. The location of the object depicted in the visual image is determined. A plurality of friend records which identify interests in respective subject matter is provided along with their general location. The identification of at least one friend interested in the subject matter of the object is identified. The location of the interested friend is determined and if the object depicted in the visual image is potentially viewable by the interested friend a notification to the interested friend of the object depicted in the visual image is sent.

In one or more embodiments of the invention, a system for recommending the viewing of an object is provided. The system includes a memory and a processor system communicatively coupled to the memory. The memory is configured to store a plurality of friend records, wherein the plurality of friend records includes an identification of interest subject matter and the friend's respective location. The processor is configured to receive a visual image of an object. The processor is further configured to determine individuals interested in viewing the actual object represented in the visual image by determining if the object is of a particular subject matter which an individual has shown an interested in. The processor determines if the object represented in the image is potentially viewable by an individual based upon their location and the processor is further configured to transmit a notification to an interested person if the object depicted in the visual image is of a particular subject matter which an individual has shown an interest in and where the image is potentially viewable by the individual at their respective location.

In accordance with one or more embodiments, a computer program product for recommending the viewing of an object is provided. The computer program product comprises a computer readable storage medium having program instructions embodied therewith, wherein the computer readable storage medium is not a transitory signal per se, the program instructions readable by a processing circuit to cause the processing circuit to perform a method. The method includes obtaining, using a processor system, a visual image of an object relating to a particular subject matter. The location of the object depicted in the visual image is determined. A plurality of friend records which identify interests in respective subject matter is provided along with their general location. The identification of at least one friend interested in the subject matter of the object is identified. The location of the interested friend is determined and if the object depicted in the visual image is potentially viewable by the interested friend a notification to the interested friend of the object depicted in the visual image is sent.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One or more embodiments of the present disclosure present an object sharing system for friends within a social network. In particular, the disclosure identifies friends within a social network who have denoted interests in certain subject matter. When an individual views a particular object the individual may request an identification of friends within the social network who may be interested in seeing the object. The individual submits a query to a friend repository to determine which friends would be interested in viewing the object and also to access the location of the object and the friends to determine which friend who might be interested also has the ability to potentially see the object. If it is determined that a friend is interested and may potentially view the object, a notification is transmitted to the interested friend notifying them of the object. In certain embodiments, the notification includes the location of the object either transmitted directly from the individual, or retrieved from a database. Also, in certain embodiments, the notification is sent only if the object is viewable by the interested individual at the time the notification sent. In other embodiments, the notification is sent as an alarm to the interested friend to indicate when the object may be viewable by them at the remote location.

A particular embodiment is associated with the viewing of celestial objects. The celestial objects represent objects which may appear simultaneously to individuals and remote friends due to the location of the respective individuals. In certain embodiments, weather conditions are considered to determine if the celestial object is viewable by an interested friend. In other embodiments, an alert is presented to the interested friend if the celestial object is not yet viewable to them due to their location. The alert will identify to the interested friend when the celestial object will be viewable to them and in certain embodiments the particular location of the celestial object is provided. In a particular embodiment, the interested friend may receive instructions on how to manipulate their respective user device to locate the celestial object.

Figure 1:
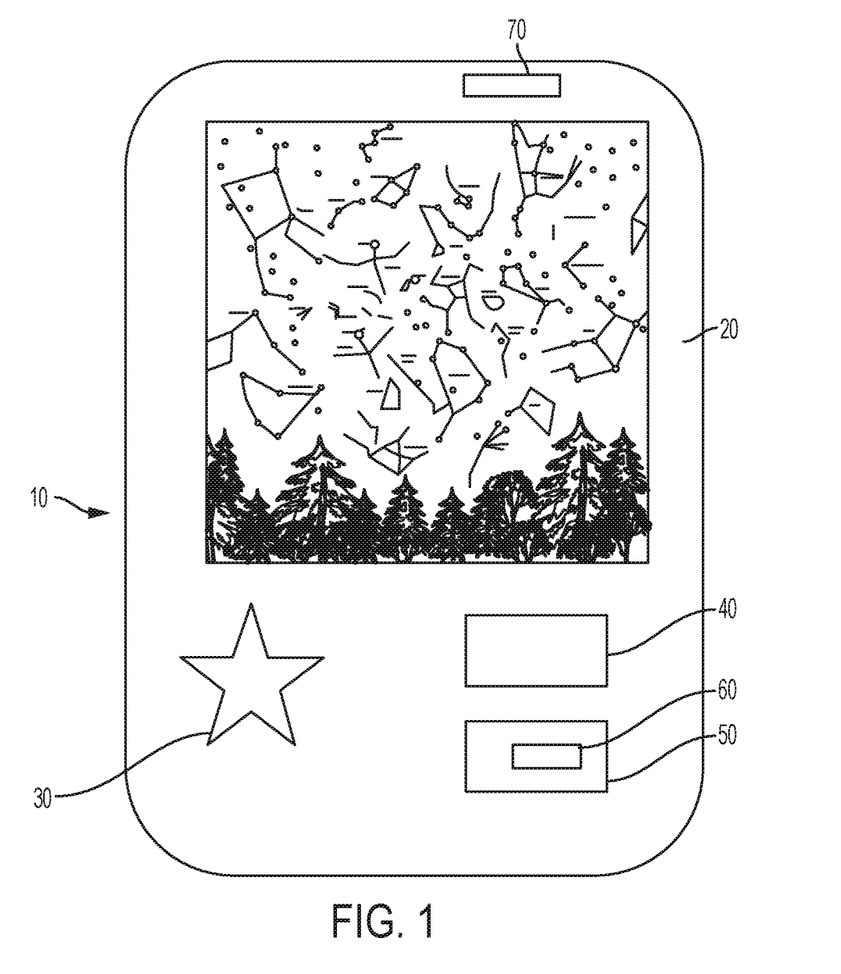
FIG. 1 shows a user device utilized in an object sharing system according to one or more embodiments.

Turning now to a more detailed description of the present disclosure, there is shown in FIG. 1 a user device 10 may be any type of computing device capable of communicating with another user device via a network. User device 10 may include a desktop computer, a laptop mobile computer, a personal data assistant, a smart phone, or a telescope equipped with communication capabilities. Each user device 10 may include a display 20 for displaying an image of an object. Each user device may include a user interface 30 such as a keyboard. User device also may include a processor 40 and instructions 50 stored in memory 60 controlling the operation of user device 10 and processed by processor 40. As shown in FIG. 1. a particular celestial object is presented in the display. The object may be representative of an image captured by a camera 70 or provided by a celestial body database such as the National Optical Astronomy Observatories via a communication network.

Figure 2:
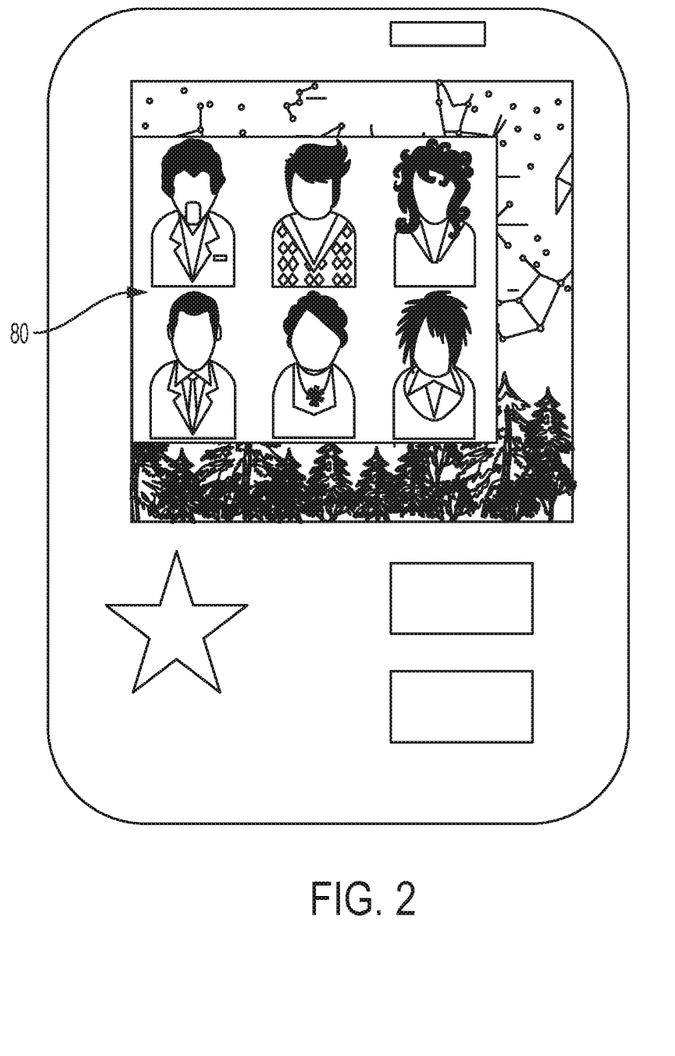
FIG. 2 shows a user device displaying a group of interested friends capable of viewing an object of interest according to one or more embodiments of the teachings herein.

As shown in FIG. 2, an individual submits a query to a friend repository to determine which friends within their social network would be interested in viewing the subject matter displayed on the screen of the user device. In this particular embodiment, the object represents a celestial body. The query also includes the location of the respective celestial body. The location of the celestial body may be provided directly from the user device, or provided by an intermediary database such as the National Optical Astronomy Observatories. The respective location of a friend is identified in the friend repository. Based on the query, those individuals who have identified an interest in the subject matter of the object depicted in the image displayed and may potentially view the object are identified by their avatar or other identification 80. These individuals may receive a notification of the object. The notification may be sent only to those individuals who may currently view the object, for instance, a friend in the Northern Hemisphere in Canada in the Eastern Time Zone may simultaneously be able to view a celestial object as the individual in Atlanta, Ga. USA. The notification may also be sent to those individuals who may not be able to view the object due to their respective location but may potentially view the object at a later time. In such circumstances, the notification may identify the time and location which the object may be viewable to the respective friend.

Figure 3:
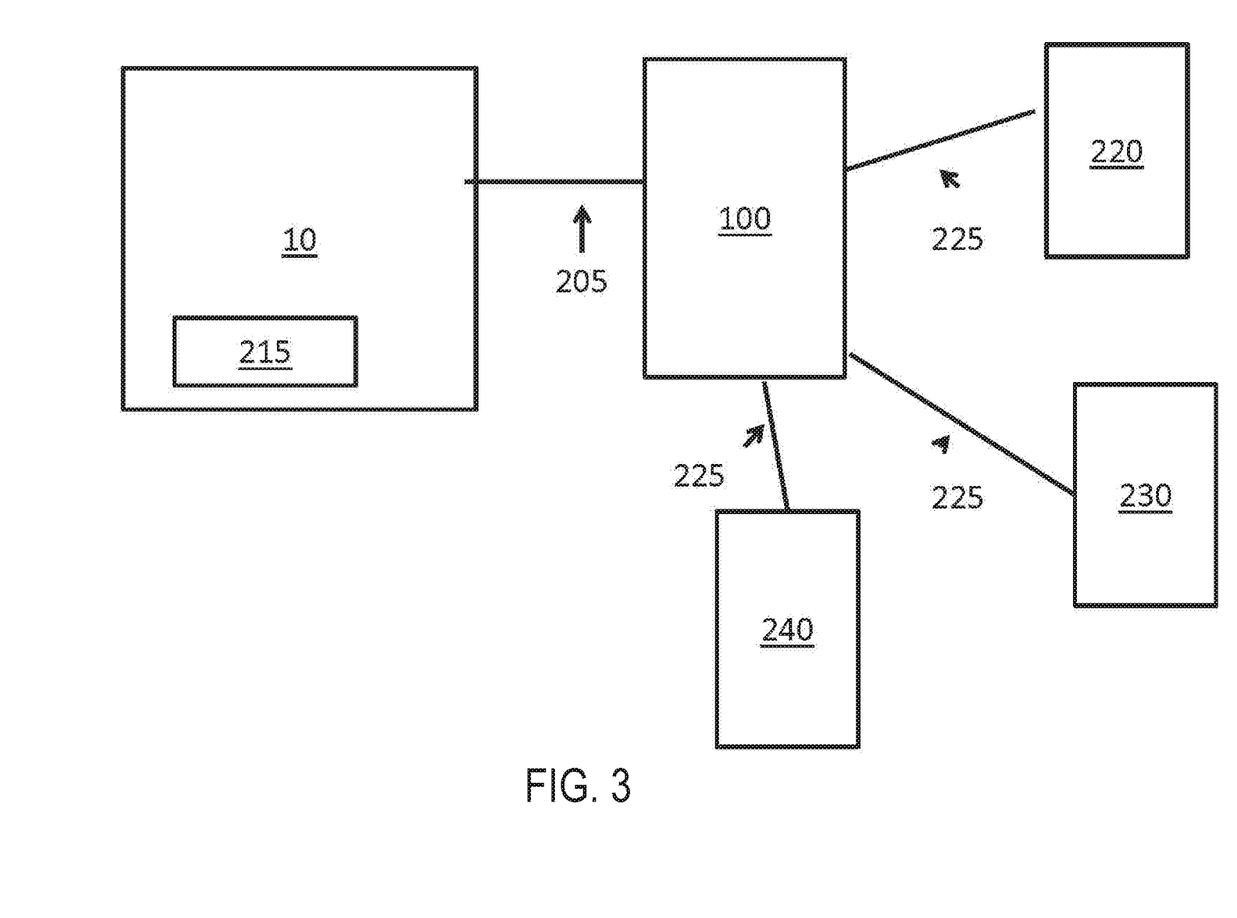
FIG. 3 shows an object sharing system according to one or more embodiments.

As shown in FIG. 3, the system for recommending viewing of an object A includes user device 10 and a central processing system 100. User device communicates with central processing system 100 via a communication network 205. Central processing system 100 may also communicate with a plurality of remote databases 220 and 230 via communication network 225. Communication network 225 may be similar to communication network 205. Remote database 220 may relate to the subject matter of interest such as celestial bodies. In this instance, remote database 220 may include locations of the celestial bodies as provided by the National Optical Astronomy Observatory. Remote database 230 may relate to weather conditions at respective locations as provided by the National Weather Service. Central processing system 100 also communicates with the respective user devices of remote individuals 240 via communications network 225.

As shown in FIG. 3, the location of the user's device may be utilized to assist in determining the location of the object depicted in the image. One approach to determining the location of the object includes utilizing the user's device which may include position sensors such as a Global Positioning System (GPS) system or other system 215. Also, the orientation of the user's device may be determined in order to provide more detailed location information should a remote friend traverse the same area at a later time and utilize this information for locating the object from the user's viewpoint. The orientation may be provided by using a compass or an inertial reference system. Additionally, a database may be accessed for determining the location of the object captured in the image. In one embodiment, a celestial database is used. The database may contain the location of the object captured in the image.

Figure 4:
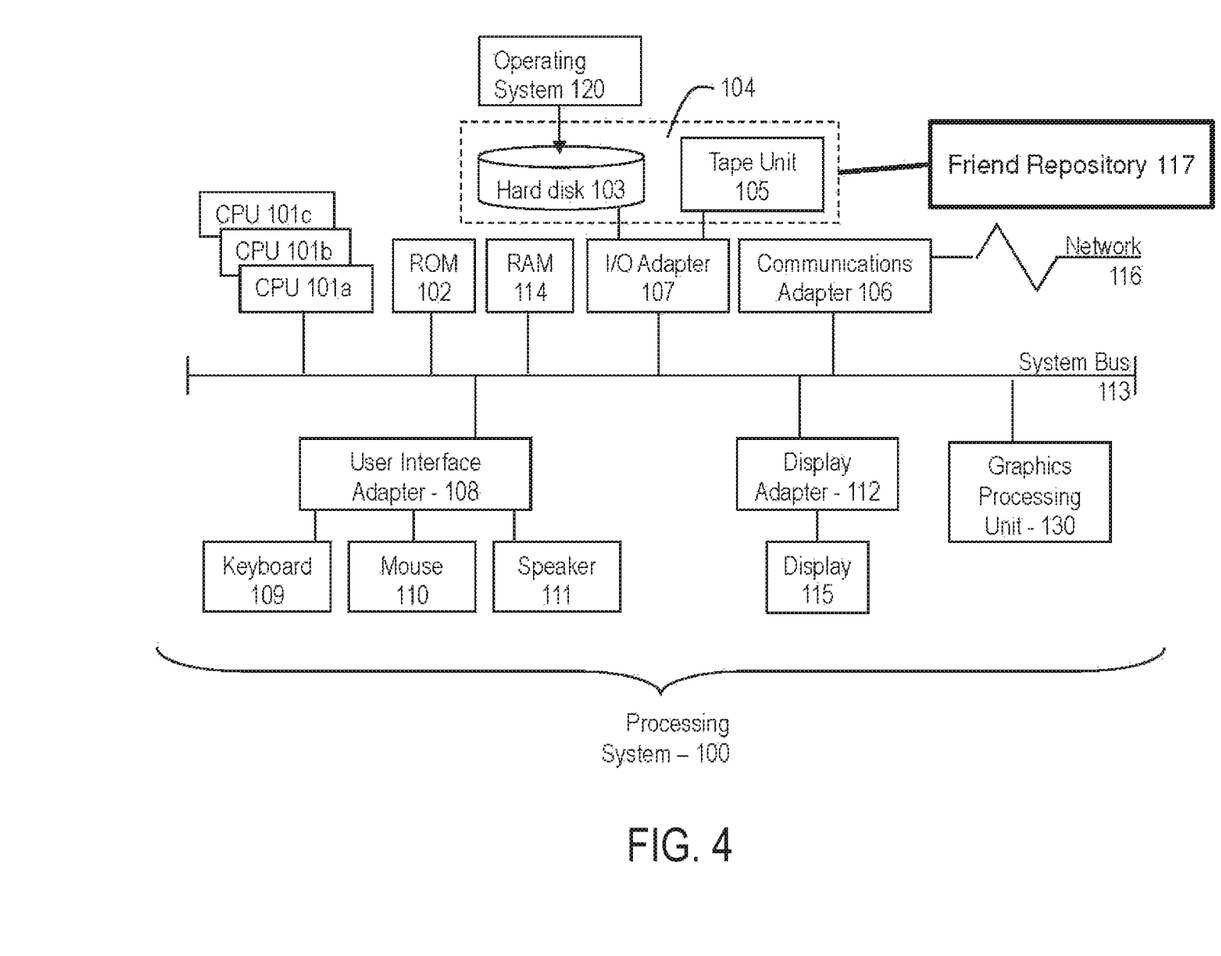
FIG. 4 is a block diagram illustrating one example of an object sharing system for practice of the teachings herein.

Referring to FIG. 4, there is shown central processing system 100 according to one or more embodiments. The system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 4 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. A friend repository file 117 is associated with mass storage 104 for storing data records containing information collected from databases 220 and 230. Friend repository file 117 includes a plurality of friend records which identify friends defined within a social network. These friends have identified subject matter which they are interested in and also their respective location. The location of the friends may be identified as a general location such as their hometown, or could by dynamically updated via a GPS system associated with their respective user device.

Thus, as configured in FIG. 4, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

Figure 5:
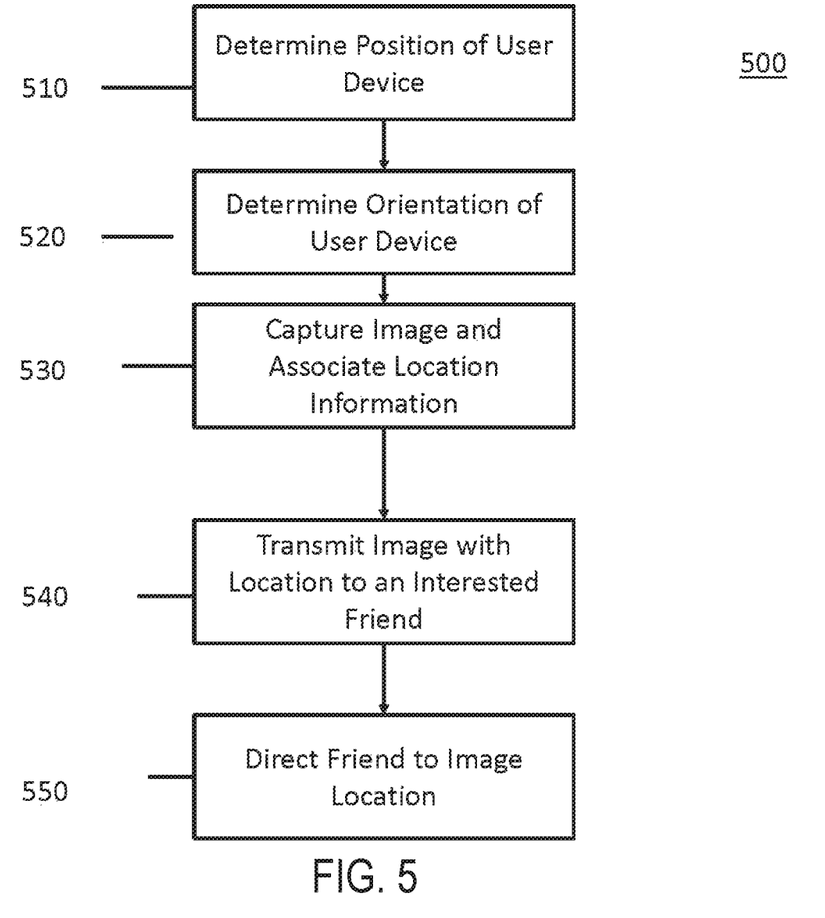
FIG. 5 shows a flow chart of the creation of a notification of an object enabling an interested friend to view the object according to one embodiment.

FIG. 5 illustrates one method 500 for providing a recommendation for viewing an object to a remote friend. As shown at block 510, the location and position of a user are determined via the user device. From this position, the orientation of the user's device is also determined at block 520. An image is captured by a user device at block 530 and is associated with the respective location information. The image and location information is transmitted to a friend who has identified an interest in the subject matter of the image at block 540. The friend is subsequently directed to the location of the image associated with their user device at block 550. In this embodiment, a person may be traversing a site which interested friends would be traversing at a later time. For instance, a person may be hiking along a trail, or shopping in a mall. If the individual becomes interested in an item, the individual may capture an image of it and send to a friend who would be interested in the item because they would be traversing the same area at a later time and are interested in the subject matter depicted in the image. When the interested friend arrived in the general vicinity at a later time, their respective user device would utilize the location information of the image in association with a respective GPS system affiliated with their user device to locate the image.

Figure 6:
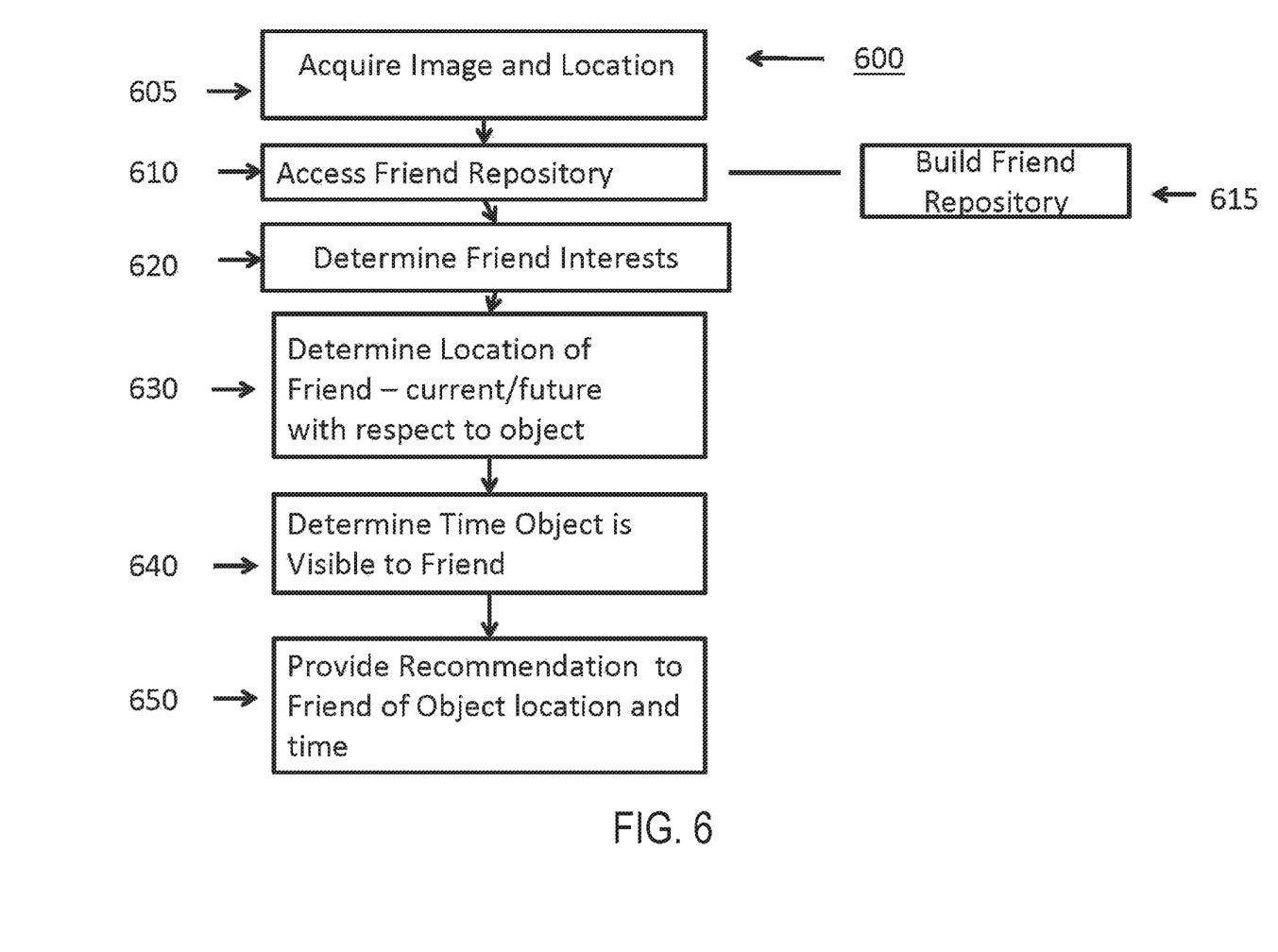
FIG. 6 shows a flow chart of providing a notification of an object enabling an interested friend to view the object according to one embodiment.

FIG. 6 illustrates an additional method for providing a recommendation for viewing an object to a remote friend 600. As shown at block 605, a user via user device 10 acquires an image of an object and its associated information. The image may depict an object captured via a camera or provided by a remote database. In one particular embodiment, the image is of a celestial body. Information associated with the object such as its name and location is obtained. Once the image is obtained, as shown at block 610, the friend repository is accessed to determine which friends within the social network would be interested in viewing the object depicted in the image. Prior to accessing the friend repository, the friend repository is built at step 615. The friend repository is built by accessing friends identified via social media. The social media may include internet websites such as Facebook® or other social media sites. From these sites, the social friends identify their interests in the respective subject matter and also their respective location. As shown at block 620, the interests of the social friends in the object depicted in the image are determined. If the friend is interested in the object, then the location of the friend with respect to the object is determined at block 630. The location of the friend with respect to the object may be determined either based on the current time or future. For instance, if the celestial body is not currently visible to the interested friend due to the present time, but would be visible at a later time, this is noted at Step 640. If the object depicted in the image is potentially visible to the interested friend, then a recommendation or notification to view the object is provided to the interested friend at Step 650. The notification may include the image location and time to view the image. This information may be provided by a remote database. Additionally, a remote weather database may be accessed to determine the weather conditions at the location of the interested friend. If it is determined that the image is not visible due to weather conditions, then the notification may not be sent.

In this illustrative example, the advantage of the embodiment as shown enables individuals to share images with interested friends at remote locations to notify them to be alert for the opportunity to view the same image from their own location. This is especially usual for individuals interested in astronomy. An individual may have the opportunity to view something unique in the night sky earlier than an interested friend due their location but who might not be watching the sky that evening. The notification alerts the interested friend to the time and location to view an image originally deemed unique by the individual. Also, an alert may be saved to inform a remote friend to view the same object the next time it appears, which may be at a much later date such as six months.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for recommending viewing of an object, the method comprising: accessing, using a processor system, a plurality of records, wherein each of the plurality of records identify an interest in the object and a last known location of a plurality of friends, wherein the last known location of the plurality of friends is identified based on a user device, corresponding to the plurality of friends, having a GPS system; obtaining, using the processor system, a visual image of the object of a celestial nature, wherein the visual image was obtained by the user device; determining, using the processor system, a location of the object depicted in the visual image; identifying, using the processor system, at least one interested friend from the plurality of friends that is interested in the object depicted in the visual image based upon the interest in the object identified in the plurality of records; determining, using the processor system, a current location of the at least one interested friend based on their user device; determining, using the processor system, if the object depicted in the visual image is visible by the at least one interested friend at a predetermined time from the current location, wherein the visibility of the object at the current location is determined by time to view the object and by weather reports for the current location; responsive to determining the object depicted in the visual image invisible, transmitting, using the processor system, a notification to the at least one interested friend, wherein the notification is transmitted only when the object is visible at the current location within a twenty-four hour period from the transmission of the notification, wherein the notification indicates a time when the object is visible at the current location and the notification includes instructions for the at least one interested friend on how to manipulate their user device to locate the object, and the notification includes orientation information of the user device used to obtain the visual image of the object, the user device having camera, coupled to the processing system, wherein the orientation information is provided using at least one of a compass or an inertial reference system of the user device used to obtain the visual image of the object to help the at least one interested friend on how to manipulate their user device to locate the object; and responsive to determining the object depicted in the visual image is not visible based on the weather report, inhibiting the transmission of the notification to the at least one interested friend of the object depicted in the visual image.

2. The computer-implemented method of claim 1 wherein the notification of the object depicted in the visual image includes the location of the object.

3. A computer program product for recommending the viewing of an object, the computer program product comprising a computer readable storage medium having program instructions embodied therewith, wherein the computer readable storage medium k not a transitory signal per se, the program instructions readable by a processing circuit to cause the processing circuit to perform a method comprising accessing, using a processor system, a plurality of records, wherein each of the records identify an interest in the object and a last known location of a plurality of friends, wherein the last known location of the plurality of friends is identified based on a user device, corresponding to the plurality of friends, having a GPS system; obtaining, using a processor system, a visual image of an object of a celestial nature, wherein the visual image was obtained by the user device; determining, using a processor system, the location of the object depicted in the visual image; identifying, using the processor system, at least one interested friend from the plurality of friends that is interested in the object depicted in the visual image based upon the interest in the object identified in the plurality of records; determining, using the processor system, a current location of the at least one interested friend based on their user device; determining, using the processor system, if the object depicted in the visual image is visible by the at least one interested friend at a predetermined time from the current location, wherein the visibility of the object at the current location is determined by time to view the object and by weather reports for the current location; responsive to determining the object depicted in the visual image is visible, transmitting, using the processor system, a notification to an the at least one interested friend of, wherein the notification is transmitted only when the object is visible at the current location within a twenty-four hour period from the transmission of the notification, wherein the notification indicates a time when the object is visible at the current location and notification includes instructions for the at least one interested friend on how to manipulate their user device to locate the object, and the notification includes orientation information of the user device used to obtain the visual image of the object, wherein the orientation information is provided using at least one of a compass or an inertial reference system of the user device used to obtain the visual image of the object to help the at least one interested friend on how to manipulate their user device to locate the object; and responsive to determining the object depicted in the visual image is not visible based on the weather report, inhibiting the transmission of the notification to the at least one interested friend of the object depicted in the visual image.

4. The computer program product of claim 3 wherein the notification of the object depicted in the visual image includes the location of the object.

5. A system for recommending viewing of an object, the system comprising: a user device having a GPS system; a memory; and a processor system communicatively coupled to the memory; wherein the memory is configured to store a plurality of records, wherein each of the plurality of records identify an interest in the object and a last known location of a plurality of friends, wherein the last known location of the plurality of friends is identified based on the user device, corresponding to the plurality of friends, having a GPS system; wherein the processor is configured to: access the plurality of records; obtaining a visual image of the object of a celestial nature, wherein the visual image was obtained by the user device; determine a location of the object depicted in the visual image; identify at least one interested friend from the plurality of friends that is interested in the object depicted in the visual image based upon the interest in the object identified in the plurality of records; determine a current location of the at least one interested friend based on theft user device; determine lithe object depicted in the visual image is visible by the at least one interested friend at a predetermined time from the current location, wherein the visibility of the object at the current location is determined by time to view the object and by weather reports for the current location; responsive to determining the object depicted in the visual image is visible, transmit a notification to the at least one interested friend, wherein the notification is transmitted only when the object is visible at the current location within a twenty-four hour period from the transmission of the notification, wherein the notification indicates a time when the object is visible at the current location and the notification includes instructions for the at least one interested friend on how to manipulate their user device to locate the object, and the notification includes orientation information of the user device used to obtain the visual image of the object, the user device having a camera, coupled to the processing system, wherein the orientation information is provided using at least one of a compass or an inertial reference system of the user device used to obtain the visual image of the object to help the at least one interested friend on how to manipulate their user device to locate the object; and responsive to determining the object depicted in the visual image knot visible based on the weather report, inhibit the transmission of the notification to the at least one interested friend of the object depicted in the visual image.

6. The system of claim 5 wherein the friend is provided directions to the object for viewing.

* * * * *